Feb. 2, 1960     D. C. ENGELBART     2,923,853

ELECTRIC DISCHARGE DEVICE

Filed July 12, 1955     8 Sheets-Sheet 1

FIG_1_

FIG_2_

INVENTOR.
Douglas C. Engelbart.
BY
Robert W. Hampton

FIG_3_

FIG_4_

INVENTOR.
Douglas C. Engelbart
BY
Robert W. Hampton

FIG. 5.

FIG_6_

FIG_7_

Feb. 2, 1960

D. C. ENGELBART 2,923,853

ELECTRIC DISCHARGE DEVICE

Filed July 12, 1955

INVENTOR.
Douglas C. Engelbart.
BY
Robert W. Hampton

Feb. 2, 1960     D. C. ENGELBART     2,923,853
ELECTRIC DISCHARGE DEVICE Filed July 12, 1955     8 Sheets-Sheet 7

FIG_10_

FIG_11_

INVENTOR.
Douglas C. Engelbart.
BY
Robert W. Hampton

ELECTRIC DISCHARGE DEVICE

Douglas C. Engelbart, Albany, Calif., assignor to Digital Techniques, Inc., Berkeley, Calif., a corporation of California Application July 12, 1955, Serial No. 521,555

35 Claims. (Cl. 315—84.6)

This invention relates to gaseous discharge devices and particularly to a multi-position glow discharge device having a system of electrodes to which signals are applied for effecting the shifting of a multiple-glow pattern in discrete steps.

Such a device may be effectively employed for sign lighting, display and advertising purposes. For example, a pattern of discrete glow discharges may be circulated in a gas-filled tube formed in a closed loop of desired shape. As another example, a gas-filled tube formed in the shape of a written message may be progressively illuminated at a selectable rate.

The present invention has special utility as a shifting register in a computer. Each glow discharge position may represent a single order of a plural-order binary number, or "word," the presence of a glow representing a binary 1 and the absence of a glow representing a binary 0, or vice versa.

The possibility of using a gaseous discharge, glow-transfer device in computing circuits has long been recognized, as evidenced by the many attempts in the prior art to develop practical versions of such devices. For example, many counting tubes have been developed wherein a single glow discharge is stepped from one discrete position to another in response to input pulses, the final position of the glow being indicative of the number of input pulses. These tubes typically employ a plurality of internal electrodes to which are applied direct current excitation potentials. However, these prior art devices do not sustain or simultaneously shift a plurality of glow discharges as is requisite for operation as a shifting register. Furthermore, such prior art devices have one or more of the following defects:

(1) Expensive and complicated internal tube structure;
(2) Critical electrode spacing tolerances;
(3) Many glass-to-metal seals;
(4) Critical electrode surface characteristics;
(5) Lack of stable and uniform operating characteristics;
(6) Small breakdown-to-extinction voltage ratio; and
(7) Requirement of highly regulated driving voltages.

In the present invention, a plurality of discrete glow discharges may be maintained, and the above defects may be obviated through the use of electrodes which are external to the gas-filled tube and to which high frequency potentials are sequentially applied for shifting the pattern of glow discharges. One embodiment of the present invention requires no internal structure, and another requires only a pair of simple, internal, "stabilizing" electrodes. The term "high frequency," where employed in the present description and appended claims, will be understood to refer to frequencies higher than audio.

Many prior art glow transfer tubes have been directed to the use of D.C. signals for causing glow transfer. When D.C. glow is employed, tube operation may be critical because of an undesirably low ratio of breakdown voltage to extinction voltage. The breakdown voltage is that voltage which must be applied across a gas in a given case to initiate a glow discharge. The glow discharge can be sustained by a voltage somewhat below the breakdown voltage but if the voltage is lowered sufficiently, a voltage level is reached where the glow dies out. This level is called the extinction voltage.

The breakdown-to-extinction voltage ratio is important because it determines the permissible variation in operating voltage; i.e., the breakdown-to-extinction voltage determines the necessary operating voltage regulation. This may be more fully appreciated from the following considerations.

Glow transfer is generally effected and controlled by applying the principle of "priming," which requires that the operating voltages applied to the tube be in the sustaining voltage range, i.e., between breakdown and extinction. For example, if a glow discharge is held at a first electrode, an adjacent, second electrode can be positioned such that the gaseous atmosphere in the region of influence of the second electrode is partially ionized due to its proximity to the glow discharge held by the first electrode, or due to ion migration. When a sustaining potential, i.e., a voltage between breakdown and extinction, is applied to such a primed electrode, the latter electrode causes a glow in its own localized area; whereas an unprimed electrode which is energized with the same potential remains inactive and does not cause its own localized glow. Therefore, the operating voltages applied to the tube must be within the sustaining voltage range. If the operating voltage drops below the extinction voltage, the glow discharges will, of course, die out and be lost; if the operating voltage rises above the breakdown voltage, spurious glow discharges will occur at unprimed electrodes.

A typical breakdown-to-extinction voltage ratio for the D.C. case is in the order of 1.15. For example, if a particular tube has a breakdown voltage of 115 volts and the above ratio, then the extinction voltage is 100 volts. Therefore, the sustaining voltage is limited to the 15 volt range between 100 and 115 volts. For reliable operation, the operating voltage excursions must, of course, be restricted to an even narrower range since the breakdown and extinction voltages vary with such things as external light, aging effects, and especially with electrode spacing. Also, if a design is to allow for tube replacement without readjustment, allowance must be made for variation of characteristics among tubes. Where a plurality of commonly connected electrodes are involved, as is the case with most prior art gaseous discharge counting tubes, it is evident that electrode spacing tolerances are very critical and operating voltages must be highly regulated to avoid spurious response of some of the electrodes or loss of glow by others.

Another important aspect of gaseous discharge tubes is the glow decay time, which is the time required, subsequent to the removal of a sustaining voltage from an electrode holding a glow discharge, for the ionization level to decrease to the extent that re-application of the sustaining voltage to the electrode does not revive the glow discharge. In other words, it is the time required for the ionization of the gaseous atmosphere associated with the electrode to drop below the priming level. The speed of operation of the tube is obviously limited by the glow decay time.

The breakdown voltage, extinction voltage, and glow decay time are interrelated functions of such physical characteristics of the tube as vessel dimensions, electrode spacing, electrode size and shape, surface characteristics of (internal) electrodes, gas composition and pressure, etc. Attempts to reduce the glow decay time of internal electrode D.C.-energized tubes have often resulted in impractically high breakdown voltages and/or breakdown-to-extinction voltage ratios which are inadequate for reliable operation.

It has been found that by applying high frequency transfer signals to entirely external electrodes, a large breakdown-to-extinction voltage ratio may be obtained. A ratio of 2 is easily attained, and a ratio of 3 or more is possible. With such a large breakdown-to-extinction voltage ratio, the electrode spacing tolerances and operating voltage regulation are, obviously, much less critical than in the case of D.C.-energized tubes. A further advantage arising from the high frequency energization of external electrodes, and the consequent large breakdown-to-extinction voltage ratios which are thereby rendered possible, is the freedom to design for a short glow decay time, thereby allowing a high overall glow transfer rate, while still maintaining a practical breakdown-to-extinction voltage ratio. An outstanding advantage of the present invention is the elimination of multiple internal electrodes. Not only is the cost lowered by the absence of complicated internal structure, but the problems of critical electrode surfaces are completely solved. Electrode surface problems arising from the use of D.C.-energized internal electrodes in prior art gaseous discharge tubes include the following:

(1) Gas clean-up due to the absorption of the gas by the metal of the internal electrodes, and resulting in relatively short tube life;

(2) Sputtering of the internal electrode metal and consequent change in tube characteristics as well as deterioration of electrodes; and (3) Unequal aging in an internal electrode tube, when some electrodes are used more frequently than others, with consequent non-uniformity of operating characteristics.

With the high frequency energized external electrodes of the present invention, gas clean-up is due to the envelope only and the gas clean-up caused by the envelope is small compared to the gas clean-up caused by internal electrodes. Sputtering is obviously eliminated and the tube ages uniformly. Therefore, the use of high frequency energized external electrodes allows the construction of gaseous glow discharge shifting tubes having stable and uniform operating characteristics. While the present invention is illustrated and described hereinafter as applied to tubes having external electrodes, it is obvious that internal electrode structures may be employed in the practice of the present invention at the sacrifice of some of the advantages discussed above. However, such high frequency energized internal electrode tubes still possess a number of advantages over the direct current or low frequency energized tubes of the prior art, for example, higher breakdown-to-extinction voltage ratio and longer electrode life.

Thus, a general object of the present invention is to provide a gaseous discharge stepping device having a plurality of discrete positions, any combination of which can be maintained in an energized condition.

Another object is to rapidly shift a glow discharge in a gas-filled tube by the application of high frequency potentials to entirely external electrodes.

A further object is to provide an improved glow shifting tube of novel construction.

Another object is to provide a novel sign-lighting device.

Other objects of the invention are:

To enter information into a shifting register by establishing a pattern of glow discharges;

To shift a pattern of glow discharges in either of two directions in a gas-filled tube;

To provide a multi-position shift register comprising a single unit of small size and low cost;

To provide a gaseous discharge tube having a plurality of discrete glow discharge positions, and having no internal electrodes;

To simultaneously register a binary word and the complement of the word in a single device; and To provide a gaseous discharge glow-shifting device having energizing circuits with substantially constant loading.

The underlying principle of the present invention is the step-shifting of a multiple-glow pattern in a single gas-filled tube.

Other objects and principles of the invention will appear from the following description, reference being made to the accompanying drawings, wherein.

Figure 1:
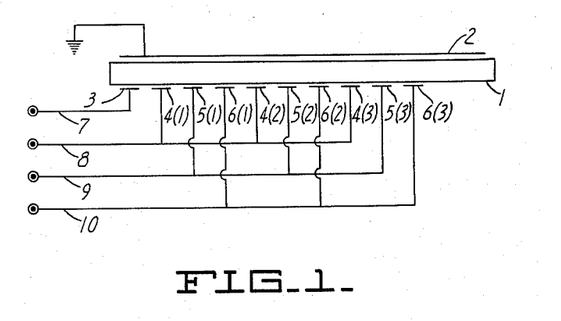
Fig. 1 is a diagrammatic representation of an external electrode, glow discharge shifting tube.

Referring to Fig. 1, three groups of electrodes 4, 5, and 6 are shown positioned adjacent a gas-filled tube 1, and opposite a common electrode 2. Tube 1 is filled to a low pressure with an ionizable gas such as neon thereby forming a gaseous discharge channel. A glow discharge is initiated by applying a burst of high frequency signal, having a potential greater than the breakdown level of the gas, to a lead 7 connected to an input electrode 3. A high frequency signal, having a potential greater than the extinction level of the gas, but less than the breakdown level, is then applied to all electrodes 4 through a first transfer lead 8. Electrode 4(1) is primed due to the proximity of starting electrode 3; therefore, it "captures" the glow discharge and sustains it. A subsequent burst of high frequency signal on a second transfer lead 9, connected to all electrodes 5, similarly effects the transfer of the glow from electrode 4(1) to electrode 5(1). A sustained high frequency signal is now applied to all electrodes 6 through a third transfer lead 10, thereby transferring the glow from electrode 5(1) to electrode 6(1) where it is held pending a subsequent shifting cycle.

Figure 3:
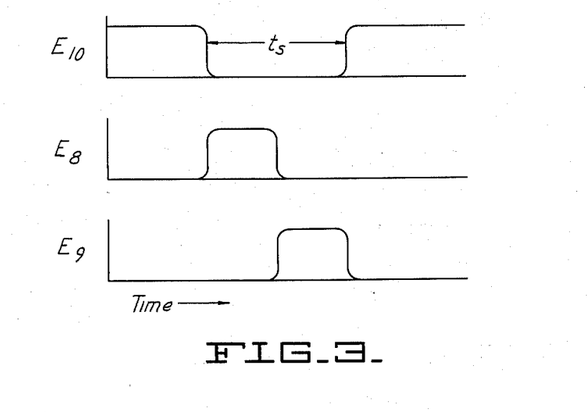
Fig. 3 is a timing diagram for a one-cycle shift sequence.

A shifting cycle may be best understood by reference to the timing diagram of Fig. 3 in which the high frequency envelopes are shown plotted against a time scale. It will be noted that all electrodes 6 are normally energized by the high frequency potential $E_{10}$. Thus, the electrodes 6 are designated "holding" electrodes. Assume that a glow discharge has been initiated and is being held by electrode 6(1) (Fig. 1) as described above. At the beginning of a shifting cycle potential $E_{10}$ (Fig. 3) is removed and a burst of high frequency signal, whose envelope is shown at $E_8$, is applied through lead 8 (Fig. 1) to all electrodes 4. The glow at electrode 6(1) is transferred to electrode 4(2). At the end of transfer signal $E_8$ (Fig. 3), a transfer signal $E_9$ is applied through lead 9 (Fig. 1) to electrodes 5 and the glow discharge steps from electrode 4(2) to electrode 5(2). At the end of signal $E_5$ (Fig. 3), the holding potential $E_{10}$ returns to electrodes 6 (Fig. 1) to complete the shifting cycle by transferring the glow from electrode 5(2) to the holding electrode 6(2). Thus a glow discharge is shifted from one holding electrode to the next successive holding electrode during each shifting cycle. Since electrodes 4 and 5 perform the shifting they are designated "shifting" electrodes. The present device can shift and hold any number of separate glow discharges within its capacity. In Fig. 1, three holding electrodes 6(1), 6(2), 6(3) are shown by way of example but the device can be expanded to any desired capacity, for example one thousand holding electrodes, by lengthening tube 1 and adding appropriate electrodes 4, 5 and 6.

Figure 2:
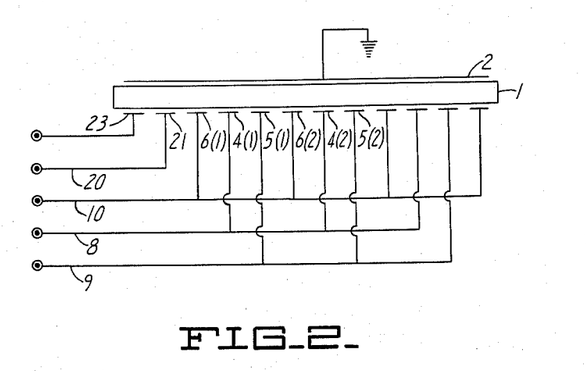
Fig. 2 is a diagrammatic representation of a glow discharge shifting tube with a stabilizing electrode.

In Fig. 2, a stabilizing electrode 23 is shown. This electrode is continually energized by a source of high frequency potential to constantly maintain a glow discharge at one end of the tube. Such an arrangement is advantageous where the device may sit idle for long periods since, as is well known, the signal potential required for causing a gaseous breakdown is influenced by the history of the device. By maintaining a constant discharge between electrode 23 and common electrode 2, the quiescent ionization level in the tube is held substantially constant; the device is thus stabilized, and reliable operation results. When it is desired to initiate a glow on the first holding electrode 6(1), an electrode 21, designated the "transfer" electrode, is energized by a burst of high frequency signal at that time in the shifting cycle when the second shifting electrodes 5 are energized (see Fig. 3). The transfer electrode 21 is primed by its proximity to the stabilizing electrode 23; therefore, electrode 21 picks up a glow whenever it is energized, and when the holding potential returns to electrode 6, this glow is transferred to the first holding electrode 6(1). Operation is otherwise the same as for the device shown in Fig. 1.

Figure 4:
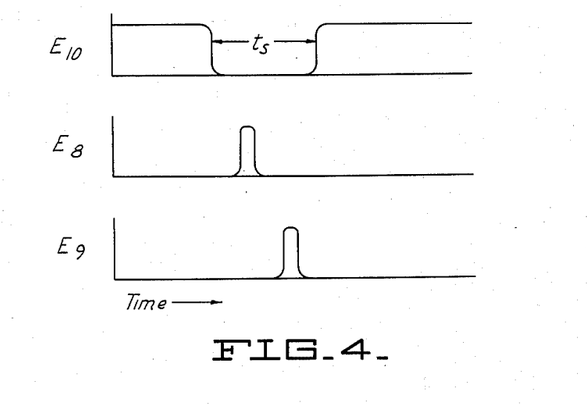
Fig. 4 is a timing diagram of a shift sequence which permits the use of a relatively short shifting time.

Fig. 4 shows a timing diagram of an alternative shifting cycle which offers the advantage of about a 25 percent increase in shifting speed. Pulses or high frequency bursts $E_8$ and $E_9$ are narrowed to the extent that a full glow discharge is not developed at the shifting electrodes. The shifting electrodes merely transfer enough ionization to prime the adjacent holding electrode. In this way the decay time of the shifting electrodes is reduced and thus a subsequent cycle can be initiated sooner to increase shifting speed.

A tube envelope containing an ionizable gas such as neon at low pressure is suggested above as a practical ionizable atmosphere or medium for the practice of this invention, however, there is virtually an infinite number of suitable ionizable media well known in the art including, to mention a few, neon, helium, air, hydrogen, argon, krypton, mercury vapor, xenon, in various mixtures and at from very low pressures to pressures above atmospheric. The medium may be sealed in an envelope or may be maintained at the appropriate pressure by conventional vacuum or pressure systems (not shown) or contained between the electrodes in any other manner.

Figure 5:
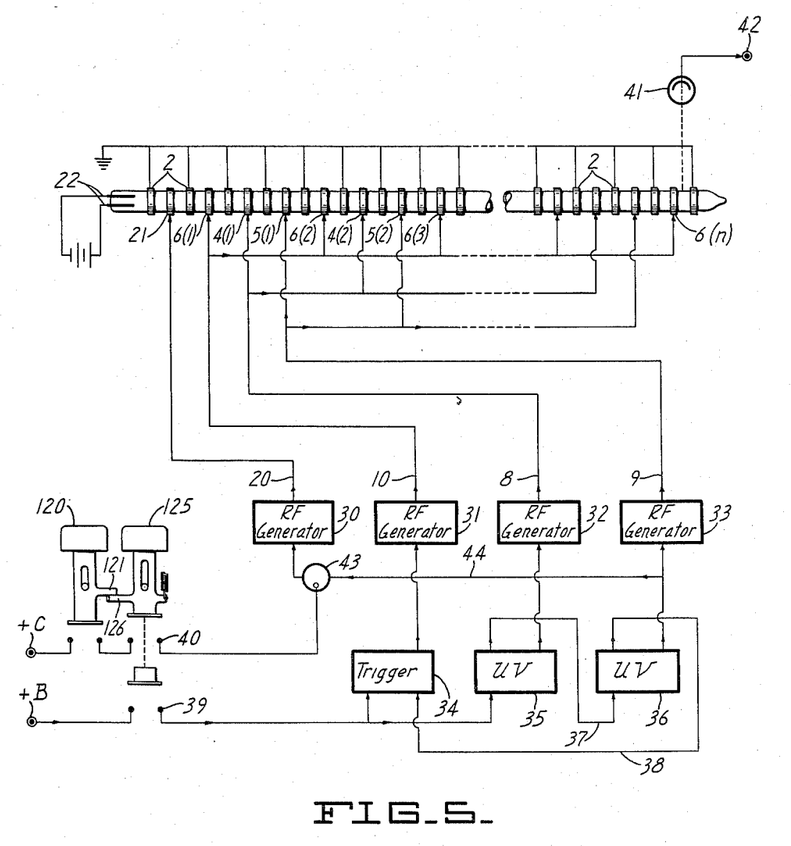
Fig. 5 is an illustration of an axial-field shifting tube with a block diagram of associated energizing circuits and an output device.

An illustration of an axial-field shifting tube register together with energizing and output circuits is shown in Fig. 5. In contrast to the arrangement shown in Figs. 1 and 2, wherein the energizing field is applied across the tube, in the axial-field construction the applied field is along the tube. The advantage of the axial construction is that the electrode spacing is independent of the tube diameter, thus allowing the use of small diameter tubes with consequent shorter glow decay time and faster shifting speeds. Also shown in Fig. 5 is a pair of D.C.-energized internal electrodes 22 which may be used in lieu of the external stabilizing electrode arrangement shown in Fig. 2.

The external electrodes in Fig. 5 are formed as rings or bands around the tube with alternate electrodes 2 connected together and grounded. These grounded electrodes are collectively analogous to the common electrode 2 of Figs. 1 and 2; accordingly, the same reference number is used. The transfer electrode 21 is placed between the first two grounded electrodes and near the internal stabilizing electrodes 22. The holding electrodes 6 and shifting electrodes 4 and 5 are connected in arrays and are positioned in sequentially alternate arrangement between grounded electrodes.

The energizing circuit comprises four high frequency generators 30 and 33, shown as rf generators, a trigger circuit 34, a pair of univibrators 35 and 36, and a gate 43. Trigger circuit 34 may be, for example, an ordinary Eccles-Jordan type of bistable circuit such as shown in Fig. 2.36 of "Electronics" by Elmore and Sands, National Nuclear Energy Series, Division V, volume 1, McGraw-Hill, 1949. Univibrators 35 and 36 are of the well-known type which provide an output pulse of selectable duration in response to each input pulse. A suitable univibrator is shown in Fig. 2.33 of the above reference. Gate 43 may be of any of the usual types that are conditioned for passing a signal by an applied arming potential. A suitable gate is shown in Fig. 3 of Patent No. 2,715,997, issued August 23, 1955 to Charles M. Hill, to which patent reference is made for a full description of the gate.

Figure 6:
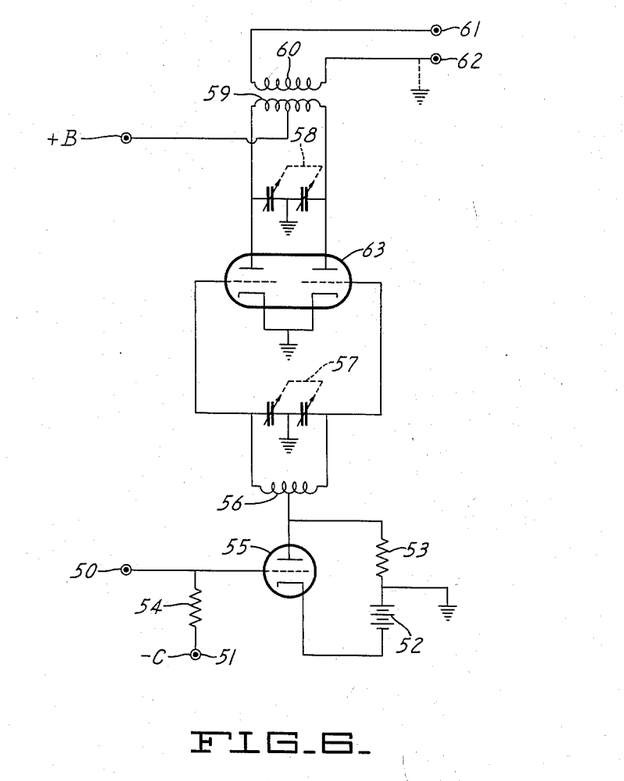
Fig. 6 is a schematic diagram of a suitable high frequency signal generator.

The high frequency generators 30 to 33 may take a variety of forms. Generator 30 has the least stringent design requirements; it energizes only one electrode, namely, the transfer electrode 21, and its power output and regulation requirements therefore are low. Generators 31, 32, and 33, however, must have sufficient power output to supply energization to a plurality of electrodes, dependent on the number of glow discharge positions desired. Also, the number of electrodes which are supporting a glow at any given time is variable; therefore, generators 31, 32, and 33 must have good regulation. A suitable embodiment of a high frequency generator is shown in Fig. 6. A tube 63, shown for example as a duotriode, is connected in a tuned-plate, tuned-grid oscillator circuit. A keying tube 55, having a plate power supply source 52 and plate resistor 53, is provided to control the oscillator. By suitable selection of keying tube control grid bias $—C$, the high frequency generator can be operated either as "normally OFF" or "normally ON." Consider, for example, the case where power source 52, which is shown as a battery, is 250 volts and the bias potential $—C$ is also 250 volts. The keying tube grid and cathode are then at the same potential, and tube 55 is normally conducting, thereby applying a relatively high negative potential through a grid tank coil 56 to the grids of the oscillator tube 63, which renders the oscillator inoperative. A negative potential of suitable level applied to a terminal 50 keys the circuit to operation by cutting off conduction in the keying tube 55, thereby removing the blocking bias from the oscillator grids. Output is taken from the high frequency generator at a pair of terminals 61 and 62 connected to a coil 60 that is coupled to a plate tank coil 59. Terminal 62 is grounded when unbalanced output is desired.

As noted above, the high frequency generator circuit may be operated as normally ON. To accomplish this, the bias potential $—C$ is chosen to keep the keying tube 55 at cutoff and thus the oscillator in operation. A positive potential applied to terminal 50 under these conditions, causes the keying tube to conduct thereby biasing the oscillator to an inoperative or OFF state.

Operation of the gas tube shift register circuit of Fig. 5 will now be described in detail by assuming, for example, that it is desired to enter the binary word 1101 into the shifting tube. The word will be entered lowest order first; thus, the digit 1 will be entered during the first digit interval, a digit interval in this case being the same as a shifting cycle.

At the beginning of each digit interval, a clock pulse from a suitable source, hereinafter described, is applied to a terminal 39. The clock pulse resets trigger circuit 34 and simultaneously reverses univibrator 35 to its abnormal state. Generator 31 is normally ON to thereby apply a holding potential to holding electrodes 6 through lead 10. When trigger circuit 34 is reset by the clock pulse, it keys generator 31 OFF to remove the holding potential from electrodes 6 as shown graphically in Fig. 3. At the same time, generator 32 (Fig. 5), which is normally OFF is kyed ON by univibrator 35 thereby applying the potential $E_8$ (Fig. 3) to shifting electrodes 4 (Fig. 5). When univibrator 35 returns to its normal state, generator 32 returns to its normal OFF condition. In returning to its normal state, univibrator 35 also generates a pulse which is conducted through a lead 37 to the input of univibrator 36, and reverses the latter to its abnormal state. Univibrator 36 transmits a keying pulse to generator 33, thereby energizing shifting electrodes 5. This same keying pulse is also conducted by a lead 44 to interrogate gate 43. The arming terminal of gate 43 is connected to a value input terminal 40. In any given digit interval, if the value to be entered is a "1" then an arming potential is applied to terminal 40 by means hereinafter described, for arming gate 43. If, however, the value to be entered is a "0" the gate 43 is left unarmed.

In the present instance, it is assumed that the binary word 1101 is to be entered. Thus the value for this first digit interval is a "1" and therefore gate 43 is armed during the first digit interval, and transmits the keying pulse from univibrator 36 to generator 30. The output of generator 30 is connected to the transfer electrode 21 through a lead 20. The transfer electrode 21, when energized, picks up a glow from the stabilizing electrode 22. When univibrator 36 returns to its normal state, shifting electrodes 5 and the transfer electrode 21 are de-energized; also, a pulse is transmitted by univibrator 36 through a lead 38 to set the trigger circuit 34, thereby keying generator 31 and returning the holding potential to holding electrodes 6. Holding electrode 6(1), adjacent the transfer electrode 21 is primed by the energized condition of the transfer electrode. Thus, upon being re-energized, the electrode 6(1) captures and holds a glow discharge to represent the entered "1" value.

The second from lowest order digit in the word 1101 is an "0" to be entered during the second digit interval. As before, a clock pulse on terminal 39 initiates the shifting cycle. Generator 31 is keyed OFF and generators 32 and 33 are sequentially keyed ON to transfer the glow (representing the first input digit "1") from electrode 6(1) to electrode 6(2). The keying pulse from univibrator 36 interrogates gate 43; however, since the value to be entered in the present digit interval is a "0," there is no input at terminal 40, and gate 43 is unarmed. Therefore, no glow is transferred to electrode 6(1) and at the end of the cycle this absence of a glow at electrode 6(1) represents the input digit "0."

The second highest and the highest order digits of the example word 1101 are "1's" and these digits are entered into the shifting register tube in the manner described above in relation to the lowest order digit "1." Thus, at the end of four digit intervals, the word 1101 is represented by a glow at electrode 6(4) (not shown), no glow at electrode 6(3) and glows at both electrodes 6(2) and 6(1). If successive clock pulses are now applied to terminal 39, it is clear that this glow pattern will be shifted by one position to the right during each shifting cycle until eventually the glow pattern reaches the rightmost end of the tube. Readout from the register tube is in the form of a photoelectric tube, or other light sensitive device 41 positioned to detect a glow held by electrode 6(n). The glow pattern is shifted through electrode 6(n) and is lost, with the readout device detecting each glow and giving an output on terminal 42 in response thereto. The example word 1101 thus appears on terminal 42 in the same order as entered into the register; i.e., lowest order first, with "1's" represented by an output signal on terminal 42 and "0's" represented by an absence of such an output signal. While the readout means is shown by way of example as a photo-electric tube, other readout means are readily apparent. For example, a pair of electrodes may be positioned in the gas which is in the region of influence of the holding electrode from which readout is desired. A D.-C. potential will then appear on these "readout" electrodes when the gas is ionized. See for example, Fig. 9 of U.S. Patent No. 2,696,566, issued to K. S. Lion et al., December 7, 1954. Other readout means include the detection of the energizing current to the electrodes of the cell from which readout is desired.

It should be noted that it is possible o enter information into the tube in one arrangement, say lowest order first, and read out this information in reverse order or highest order first. To accomplish this, an output device positioned to detect a glow supported by electrode 6(1) is required. The desired information is entered in the normal manner; then leads 8 and 9 are interchanged, by suitable switching arrangement (not shown) if desired, to thus reverse the direction of shifting. The highest order digit will thus be the first detected.

In regard to the transfer electrode 21 (Fig. 5), it is suggested that this electrode may be internal (similar to the internal stabilizing electrodes 22), in which case, it can be energized by a univibrator, similar to univibrators 35 and 36, replacing generator 30.

The clock pulse input to terminal 39, and the value input to terminal 40 may be received, for example, from a clock pulse lead and an information pulse lead in a serial-type electronic digital computer, a number of which are known in the art. An example of such a computer is disclosed in the copending application Serial No. 458,473, filed September 27, 1954 by George B. Greene et al., wherein the output terminal "OP" (Fig. 35 of the reference application) may be connected to terminal 39 of the present Fig. 5, and the 1's Transfer Bus (Fig. 32 of the reference application) may be connected to terminal 40 of the present Fig. 5. A delay line of appropriate time characteristics may be inserted in series with terminal 40 to insure the simultaneous arming and interrogation of gate 43.

Means are shown in Fig. 5 for manually entering digit signals and clock pulse signals. A first key 120 is first depressed when entry of a digit "1" is to be set up. Key 120 is adapted, when depressed, to partially complete a circuit from a source of gate-arming potential +C to the input terminal 40. Key 120 has an arm 121 overlying an arm 126 of a second key 125 which is spring urged to its raised position. When key 125 is fully depressed it completes the circuit from +C to terminal 40 if key 120 is in its depressed position, and irrespective of the position of key 120, it completes a circuit from a power source +B to the clock terminal 39. Depression of key 120 partially depresses key 125 through arms 121 and 126. When the value which has been set up is to be entered, key 125 is fully depressed and connects source +B to terminal 39, thereby applying a clock pulse to the circuit. Key 120 remains depressed, and key 125 also completes the circuit from +C to terminal 40, thereby arming gate 43 for entry of a digit "1." When key 125 is released, both keys are raised. Key 125 is maintained depressed until gate 43 is interrogated in the manner previously described. Entry of a digit "0" is accomplished by depressing only key 125, in which case a clock pulse is entered but gate 43 is not armed, and no digit signal is transmitted by that gate.

Figure 7:
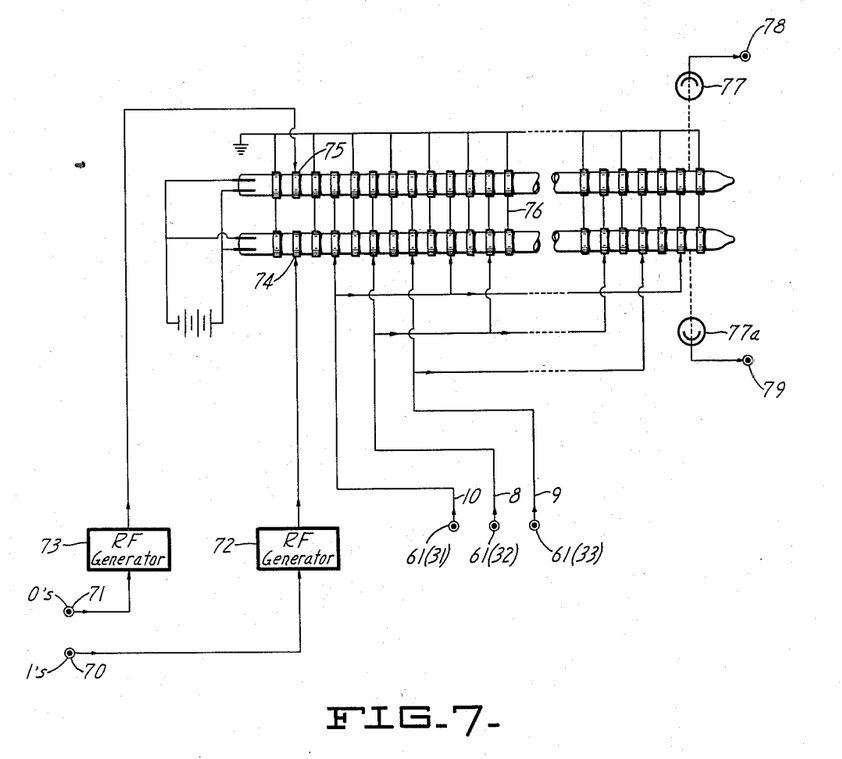
Fig. 7 is an illustration of an embodiment of the present invention wherein provision is made for simultaneously registering both a word and its complement.

A "complement" tube shift register embodiment of the present invention is shown in Fig. 7. Two glow discharge tubes are, in effect, connected in parallel (e.g. connection 76) except for their respective transfer electrodes 74 and 75. Each transfer electrode 74 and 75 is connected for energization by respective high frequency generators 72 and 73. Generator 72 is controlled by a 1's input at a terminal 70; generator 73 is controlled by a 0's input at a terminal 71. The shifting circuitry connected to terminals 61 may be identical to that of Fig. 5, hereinbefore described.

The digit to be entered into the shifting register in any given digit interval will, of course, be either a 1 or a 0 as represented by a keying pulse at either terminal 70 or 71. A keying pulse at terminal 70 keys generator 72 to energize transfer electrode 74, thereby, initiating a glow at the first holding electrode of the lower (or 1's) tube in the manner previously explained. Likewise, a 0's keying pulse at terminal 71 causes a glow to be entered in the first holding electrode of the upper (or 0's) tube. Note that when a glow discharge is held in a given position of one tube, a no-glow condition exists in the corresponding position of the other tube. For example, assume that the binary word 1001 is entered into the register. The glow pattern of the 1's tube is: glow, no-glow, no-glow, glow. The corresponding glow pattern of the 0's tube is: no-glow, glow, glow, no-glow. The glow patterns in the two tubes shift together and are read out by respective glow detectors 77 and 77a onto a pair of output terminals 78 and 79.

A distinct advantage of the complement tube arrangement is that the loading on the shifting and holding generators is constant. This may be understood by recalling that when a glow exists in a given position of one tube, a no-glow condition exists in the corresponding position of the other tubes. With constant loading, the regulation requirement is less severe, and this simplifies the design of the high frequency generators.

The 0's input to terminal 71 may be controlled by keys as shown in Fig. 5, or it may be received from a computer, such as from the 0's Transfer Bus shown in Fig. 32 of the previously mentioned application Serial No. 458,473.

In order to further improve the operation of the circuit shown in Fig. 7, the two tubes may be constructed as one tube, for example by joining them at their righthand ends. This arrangement assures uniformity of gas pressure in both branches and therefore greater uniformity of operation.

Figure 8:
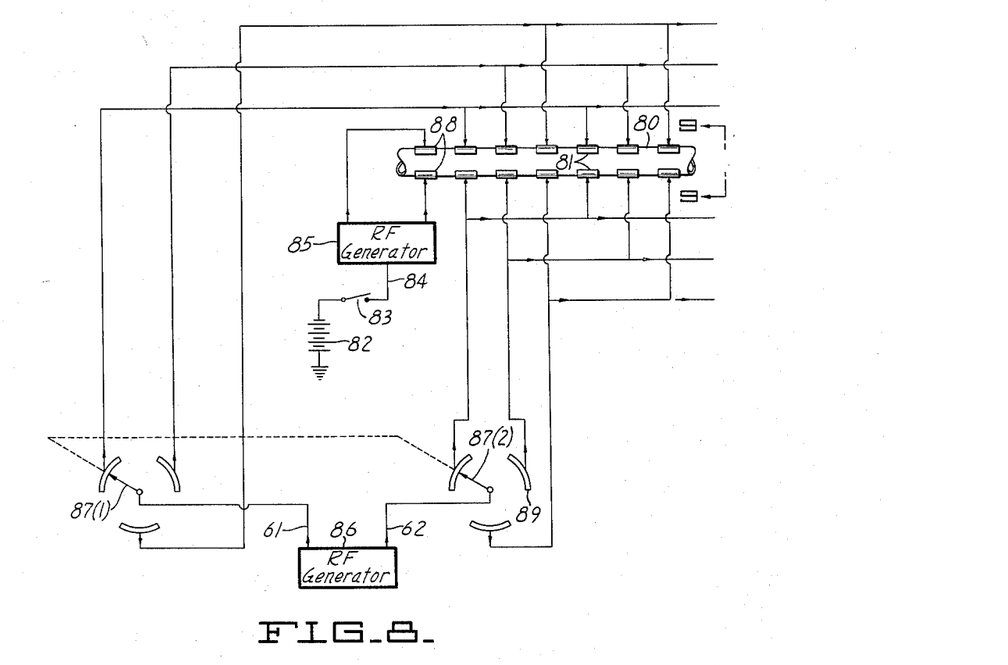
Fig. 8 is an illustration of an embodiment of the present invention as applied to sign lighting.
Figure 9:
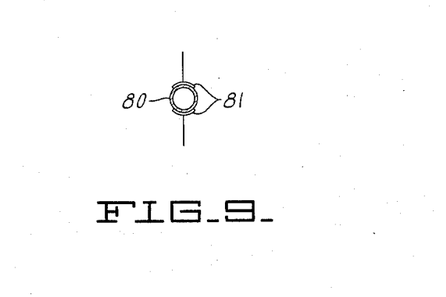
Fig. 9 is a cross-section view of the device shown in Fig. 8.

Figs. 8 and 9 illustrate an embodiment of the present invention which is particularly suitable for sign lighting. This embodiment also illustrates that existing neon signs and the like may be converted to take advantage of discrete glow shifting by external electrodes to produce many novel effects. Tube 80 may be, for example, an existing neon tube forming a "frame" around a sign or window in well-known fashion. Pairs of electrodes 81 are cemented to the tube 80 to form discrete glow discharge positions. A high frequency generator 85 is keyed by a switch 83 for initiating a glow discharge at a pair of electrodes 88 positioned to prime one of the electrode pairs 81. Electrode pairs 81 are connected in the sequentially alternate arrangement hereinbefore described and are sequentially energized for shifting the glow discharges by a high frequency generator 86 connected to the electrodes through a double-pole, three-contact rotary switch 87. Switch 87 can be driven in any convenient manner to give the desired shifting speed within limits determined, in part, by the diameter of tube 80. A series of switch contact segments 89 provide the necessary dwell time for each set of electrodes. By selectively timing the operation of switches 83 and 87, a progression of glow discharges can be propagated along the tube at a visually perceptible speed; or at a higher speed to give the effect of continuous flow in the tube. Novel effects can also be produced by using contact segments of different lengths, thus giving, for example, a fast shift followed by a slow shift.

Among other possible novel effects, are the following: Tube 80 can be formed in the configuration of written characters; progressive excitation of the glow positions will then create the illusion of writing.

A more elaborate example is an arrangement of horizontal straight tubes in an array with vertically aligned glow discharge positions. By entering the proper glow discharge pattern in each tube, the resulting composite glow pattern may form selected characters or figures.

It should be noted that in the embodiment shown in Fig. 8, balanced feed is employed from the high frequency generator output terminals 61 and 62 to the electrode pairs. The use of balanced feed is helpful in reducing high frequency radiation from the system. Also to be noted is that while electro-mechanical switching and a particular electrode structure are described in this sign-lighting embodiment of the present invention, it is obvious that other switching and electrode arrangements, for example, those of Fig. 5, may also be employed for sign lighting.

Figure 10:
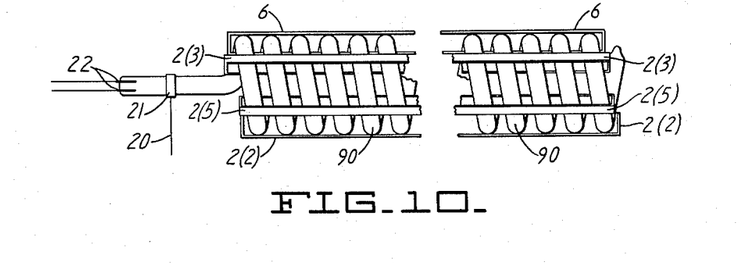
Fig. 10 is a front view of a glow discharge shifting tube in helical form.
Figure 11:
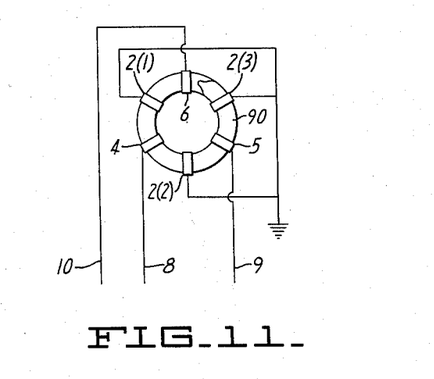
Fig. 11 is a right side view of the device shown in Fig. 10.

Illustrated in Figs. 10 and 11 is a helical form of a glow discharge shifting tube. Such a tube offers particular advantages as a shift register since its electrode structure especially is simple to construct, and the helical form greatly reduces the overall length needed for a given "bit" capacity, thus, resulting in a very compact unit.

Tube 90 may be, for example, a one-eighth inch Pyrex glass tubing wound in a helical form of one-half inch inside diameter. The number of turns of the helix in the tube shown in Figs. 10 and 11, is equal to number of bits of register capacity. Six strips or bands are looped longitudinally around the turns of the helix to form equally spaced electrodes. Alternatively, the gaseous discharge channel may be formed by a helical groove along the surface of, for example, a glass or ceramic cylinder. In this case the electrodes would lay longitudinally along the outside of the cylinder. Alternate electrodes 2(1), 2(2), and 2(3) are the common electrodes and are connected together and grounded. Holding electrode 6 and shifting electrodes 4 and 5 are connected by respective leads 10, 8 and 9 to shifting circuitry as shown in Fig. 5, previously described. Likewise, stabilizing electrodes 22 and transfer electrode 21 are similar in structure and function to those shown in Fig. 5. A glow discharge in the helical tube shown advances by one turn of the helix during each digit interval or shifting cycle. The helical tube is essentially a "rolled-up" axial field design, and its operation is similar to the axial-field version of Fig. 5 previously described. It should be noted that a larger diameter helix may be used and a plurality of holding and shifting electrodes may be connected in arrays and arranged about the helix. Each cycle of operation will shift a glow discharge from one holding electrode to another as described. For example, if three holding electrodes 6 are used, the glow discharge will advance by one third of one turn of the helix during each shifting cycle.

Figure 12:
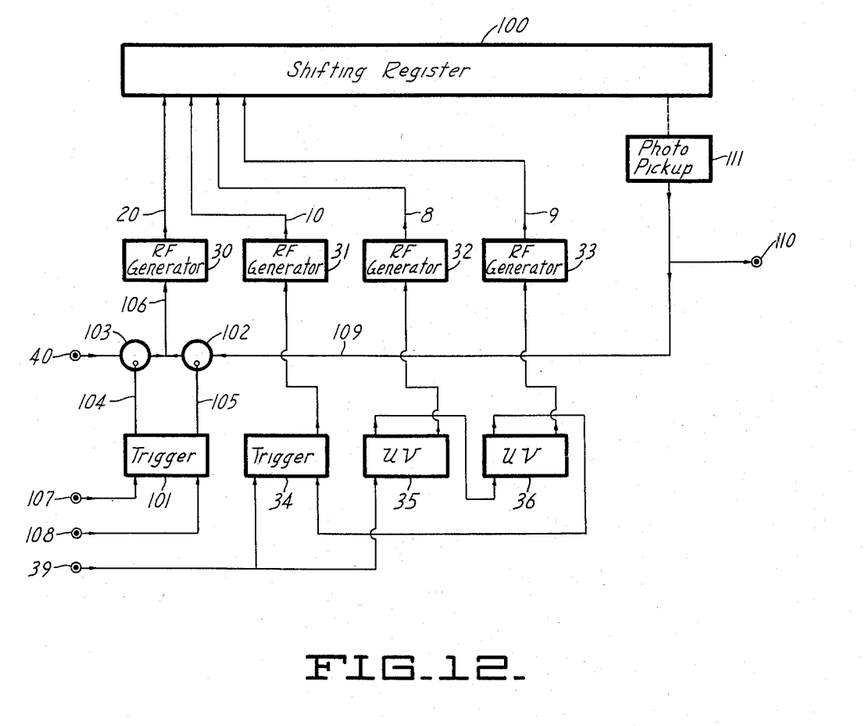
Fig. 12 is a block diagram of a system for selectably either entering new information or recirculating old information in a shifting register.

Computers are, generally, time base machines. Typically, a continuous train of clock pulses is generated and sent to all the main units of a computer, the clock pulses serving to synchronize the operation of the various units. It has been described previously how clock pulses applied to terminal 39 (Fig. 5) initiate a shifting cycle of a gaseous discharge shift register. A clock pulse train thus causes a continual shifting of the information in the register. To avoid the loss of the information, it is necessary to either read out the information to a utilization circuit, or stop the clock pulses at an appropriate point and permit the holding electrodes to statically maintain the glow pattern or recirculate the information. Fig. 12 shows a circuit in block form for recirculating present information in a shifting register.

A pair of gates 102 and 103 are controlled respectively by the set and reset outputs of a trigger circuit 101; i.e., when trigger circuit is set, gate 102 is armed and gate 103 is unarmed; when trigger circuit 101 is reset, the reverse condition obtains. Therefore, one and only one gate 102 and 103 is armed to pass a signal at any one time. The previously described signal input terminal 40 is connected to the input of gate 103, and receives 1's pulses representative of new information. If gate 103 is armed, a digit 1 pulse applied to terminal 40 passes through gate 103 for energizing the previously described generator 30 to thereby enter a glow discharge into the register 100 in the manner hereinbefore described.

A lead 109 connects the output of a photo-pickup 111 to the input of gate 102. If gate 102 is armed, it transmits the output pulses from the photo-pickup to generator 30 to thereby re-enter the output information.

The recirculation circuit is controlled through a pair of terminals 107 and 108 connected, respectively, to the reset and set inputs of trigger circuit 101. A pulse on terminal 107 resets the trigger circuit to arm gate 103, thereby conditioning the circuit to receive new information. A pulse on terminal 108 sets the trigger circuit, arming gate 102 and causing the present information to recirculate. The inputs to terminals 107 and 108 may be controlled by selectively connecting these terminals to a power supply through simple switches (not shown), or they may be controlled from automatic timing or control outputs of a computer or other control device.

A recirculation system of this kind is also applicable to sign lighting where a glow pattern may be selectable recirculated or altered.

The invention claimed is:

1. A gaseous glow discharge device comprising: an elongated envelope containing an ionizable medium; a common electrode external of and adjacent to said envelope; an external starting electrode located across said envelope from said common electrode; first and second arrays of external shifting electrodes and an array of external holding electrodes, arranged in alternating sequence along said envelope, and located across said envelope from said common electrode; a selectively operable circuit for energizing the starting electrode to initiate glow discharges in the envelope between the starting electrode and the common electrode; and a cyclically operable circuit for sequentially energizing the respective first and second arrays of shifting electrodes and the array of holding electrodes for advancing each initiated glow along the envelope.

2. A gaseous discharge device comprising: a channel having therein an ionizable medium; a common electrode along said channel; a starting electrode in glow-initiating relation to said common electrode; means for applying a high frequency potential to the starting electrode to thereby initiate a glow discharge; a plurality of first shifting electrodes in glow-sustaining relation to said common electrode; means for applying a high frequency potential to said first shifting electrodes to thereby capture a glow discharge from said starting electrode; a plurality of second shifting electrodes in glow-sustaining relation to said common electrode; means for applying a high frequency potential to said second shifting electrodes to thereby capture glow discharges from said first shifting electrodes; a plurality of holding electrodes in glow-sustaining relation to said common electrode; and means for applying a high frequency potential to said holding electrodes to thereby capture glow discharges from said second shifting electrodes.

3. A gaseous discharge glow shifting device comprising: a channel having therein an ionizable medium; a common electrode adjacent said channel; a stabilizing electrode opposite said common electrode; a plurality of electrically connected holding electrodes spaced along said channel opposite said common electrode; a transfer electrode opposite said common electrode and located between said stabilizing electrode and one of said holding electrodes; a respective first and second shifting electrode positioned between each two successive holding electrodes and opposite said common electrode; means for continuously energizing said stabilizing electrode to maintain a glow discharge in said channel and adjacent the stabilizing electrode; means for periodically energizing the holding electrodes; selectively operable means for energizing the transfer electrode in timed relation to the energization of the holding electrodes to propagate a glow discharge in said channel from the area adjacent the stabilizing electrode to the area adjacent one of said holding electrodes; and means for alternately energizing said first and second shifting electrodes in timed relation to the energization of said holding electrodes for shifting each glow in said channel from the area adjacent one holding electrode to the area adjacent the next succeeding holding electrode.

4. A gaseous discharge device comprising: a channel containing an ionizable medium; means for continually maintaining a stabilizing discharge at a given position in said channel; means defining a plurality of discrete glow discharge positions; means adjacent said stabilizing glow discharge for priming one of said glow discharge positions; means for establishing an information representing glow discharge separate from said stabilizing discharge at said primed glow discharge position; and shifting means positioned between said discrete glow discharge positions for shifting information representing glow discharges from one discrete glow discharge position to another.

5. A gaseous discharge device comprising: a channel having therein an ionizable medium; a common electrode extending along said channel; means for maintaining a glow discharge in a predetermined area of said channel; a plurality of normally energized holding electrodes in glow-sustaining relation to said common electrode; separate means adjacent said maintained glow discharge area selectably priming one of said holding electrodes; a respective first and second shifting electrode positioned between each two successive holding electrodes and in glow-sustaining relation to said common electrode; a cyclically operable circuit for periodically (1) de-energizing said holding electrodes, (2) sequentially energizing said first and second shifting electrodes, and (3) re-energizing said holding electrodes, to shift each glow discharge from one holding electrode to another.

6. In a gaseous discharge shift register, the combination of: a channel containing an ionizable medium; first, second and third juxtaposed arrays of electrodes adjacent said channel defining a plurality of discrete glow discharge positions, each group of three of said electrodes corresponding to a respective order of a binary word; and means for establishing a pattern of glow discharges representative of said word, said means including a cyclically operable circuit connected to said first, second, and third arrays of electrodes for sequentially applying a high frequency potential to said electrodes for shifting the pattern of glow discharges by one order during each cycle of operation of said circuit.

7. A discharge shifting device comprising: an envelope containing an ionizable medium; a plurality of iterative arrays of external electrodes adjacent said envelope defining a plurality of discrete discharge positions; input means for establishing a pattern of discharges in said envelope; means for supplying high frequency energizing potentials to said arrays; and means for altering the energization of said arrays in a predetermined sequence for shifting the entire pattern of discharges.

8. In a gaseous discharge device, the combination of: an elongated envelope containing an ionizable medium; a pair of internal stabilizing electrodes positioned at one end of said envelope; a plurality of external common electrodes spaced along said envelope, the first common electrode being located adjacent said stabilizing electrodes; an external transfer electrode positioned between the first two common electrodes; a plurality of external first shifting electrodes successively positioned between the third and fourth, and each third succeeding overlapping pair of common electrodes; a plurality of external second shifting electrodes successively positioned between the fourth and fifth, and each third succeeding overlapping pair of common electrodes; a plurality of holding electrodes successively positioned between the second and third, and each third succeeding overlapping pair of common electrodes; means for continuously energizing the stabilizing electrodes to maintain a stabilizing glow discharge in the envelope in the area of the stabilizing electrodes; means for periodically energizing the holding electrodes; a selectively operable circuit for energizing the transfer electrode in timed relation to the energization of the holding electrodes to propagate a glow discharge in said envelope from the area adjacent the stabilizing electrode to the area adjacent a first one said holding electrodes; and means for alternately energizing said first and second shifting electrodes in timed relation to the energization of said holding electrodes for shifting each glow in said envelope from the area adjacent one holding electrode to the area adjacent the next succeeding holding electrode.

9. An electrode arrangement for a gaseous discharge device comprising: an elongated envelope having therein an ionizable medium; a plurality of electrodes spaced along said envelope, each forming an external band around said envelope and collectively constituting a common electrode; and a plurality of energizing electrodes each forming an external band around said envelope, each interposed between the electrodes constituting said common electrode and connected in sequentially alternate arrangement to form a plurality of arrays.

10. A gaseous discharge shift register comprising: an envelope containing an ionizable medium; first, second and third juxtaposed arrays of electrodes adjacent said envelope and defining a plurality of discrete glow discharge positions each non-overlapping group of three of said positions corresponding to a respective order of a binary word; means for establishing a pattern of glow discharges in said envelope representative of said word; and energizing means connected to said electrodes for shifting said pattern.

11. In a gaseous discharge device, the combination of: a pair of adjacently positioned elongated envelopes containing an ionizable medium; a plurality of first shifting electrodes spaced along said envelopes, each forming an external band around both envelopes; a plurality of second shifting electrodes, each forming an external band around said envelopes in juxtaposition to said first shifting electrodes; a plurality of holding electrodes, each forming an external band around said envelopes in juxtaposition to said second shifting electrodes; a common electrode positioned between each two successive shifting and holding electrodes; means connecting all of said common electrodes to a source of reference potential; and a cyclically operable circuit for sequentially energizing the first shifting electrodes, the second shifting electrodes and the holding electrodes, in groups and in mutual timed relation.

12. The gaseous discharge device defined in claim 11, wherein said envelopes are joined to contain a common ionizable atmosphere.

13. In a gaseous discharge shift register, the combination of: an elongated envelope in helical form and containing an ionizable medium; a pair of external shifting electrodes and an external holding electrode disposed longitudinally along the turns of said helix; means for establishing a selected pattern of glow discharges in said envelope; means normally operative to energize said holding electrode; and a cyclically operable circuit for sequentially de-energizing said holding electrode and for energizing said shifting electrodes seriatim to shift said pattern of glow discharges a predetermined distance along said envelope during each cycle of operation of said circuit.

14. In a gaseous discharge shift register, the combination of: an elongated envelope in helical form and containing an ionizable medium wherein each turn of the helix corresponds to a glow discharge position; a plurality of external electrodes disposed longitudinally along the turns of said envelope in 60 degree relationship comprising, in the order named, a first common electrode, a first shifting electrode, a second common electrode, a second shifting electrode, a third common electrode, and a holding electrode; a connection between each common electrode and ground; means for establishing a pattern of glow discharges in said envelope to represent a first value by the presence of a glow in a given turn of the helix, and a second value by the absence of a glow in a given turn of the helix; means for normally energizing said holding electrode; and a cyclically operable circuit for temporarily de-energizing said holding electrode, and for energizing said first and second shifting electrodes in timed relation to the de-energization of the holding electrode, to shift said pattern of glow discharges by one helical turn during each cycle of operation of said circuit.

15. A gaseous discharge shifting device comprising: an envelope containing an ionizable medium; first, second and third iterative arrays of external electrodes adjacent said envelope and in operative relation to grounded electrodes; means for establishing a pattern of glow discharges including a circuit connected to said arrays for sequentially shifting said pattern; and a photo-electric device for detecting said pattern of glow discharges.

16. In a gaseous discharge shift register, the combination of: an envelope containing an ionizable medium; first, second and third juxtaposed arrays of electrodes adjacent said envelope defining a plurality of discrete glow discharge positions, successive non-overlapping groups of three electrodes corresponding to respective orders of a binary word; means for establishing a pattern of glow discharges representative of said word, said means including a cyclically operable circuit connected to said first, second and third arrays of electrodes for sequentially applying a high frequency potential to said electrodes for shifting the pattern of glow discharges by one binary order during each cycle of operation of said circuit; and readout means for detecting glow discharges at one of said glow discharge positions.

17. A glow discharge shift register comprising: first and second register channels containing an ionizable medium; means for entering a first glow pattern representative of the true form of a binary word into said first register channel; means for entering a second glow pattern representative of the complement of said binary word into said second register channel; and means for simultaneously shifting said first and second glow patterns.

18. The shift register defined in claim 17, wherein said first and second channels are formed of a single envelope to contain a common ionizable medium.

19. The shift register defined in claim 17, wherein said channels are formed of envelopes containing an ionizable medium and wherein said shifting means includes electrodes, all of which are located externally of said envelopes.

20. In a device for registering binary words, the combination of: first and second channels each containing an ionizable medium; a plurality of electrodes associated with both of said channels and disposed in operative relation thereto for defining a plurality of discrete glow discharge positions; respective input means for entering into said channels mutually complementary glow patterns representative of a binary word; and a cyclically operable drive circuit connected to said electrodes for energizing the latter to ordinally shift the glow patterns in both of said channels in unison.

21. The device defined in claim 20, wherein said first and second channels are formed of a single envelope.

22. A gaseous discharge device comprising: an elongated envelope containing an ionizable medium, first, second, and third arrays of electrode pairs positioned in sequentially alternate arrangement adjacent said tube; means for establishing a pattern of glow discharges in said envelope; a high frequency generator; and means for sequentially connecting said generator to each array for shifting said glow discharge to successive electrode pairs.

23. An information registering device comprising: a channel containing an ionizable medium; first, second, and third juxtaposed arrays of electrodes adjacent said channel defining a plurality of discrete discharge positions each group of three of said electrodes corresponding to a respective order of a binary word; input means for establishing a pattern of discharges representative of said word in said channel; a cyclically operable circuit connected to said first, second, and third arrays of electrodes for sequentially applying a high frequency potential to said electrodes for shifting the pattern of discharges by one order during each cycle of operation of said circuit; output means for sequentially detecting the discrete discharges of said pattern; an information transmitting connection between said output means and said input means; and means for enabling said connection for re-entering said pattern of discharges into said channel.

24. In a gaseous discharge system, the combination of: an envelope containing an ionizable medium and having no internal electrodes; a plurality of external electrodes connected to form a plurality of arrays disposed adjacent said envelope in sequentially alternate arrangement and defining a plurality of glow discharge positions; means for initiating a glow discharge in said envelope; and cyclically operable means connected to said arrays of electrodes for sequentially shifting the glow discharge from one of said glow discharge positions to another one of said positions.

25. A gaseous discharge device comprising: an envelope containing an ionizable medium; a plurality of holding electrodes and a plurality of first and second shifting electrodes arranged in iterative arrays along said envelope and external of said envelope and defining a plurality of value representing glow discharge positions; separate means for selectable priming one of said holding electrodes for entering glow discharges into said envelope; means for normally energizing said holding electrodes for establishing a glow discharge at said selected holding electrode; and a cyclically operable circuit for sequentially de-energizing said holding electrodes and for energizing said first and second shifting electrodes in turn for advancing each entered glow discharge from one value representing position to a successive value representing position during each cycle of operation of said circuit.

26. In a gaseous discharge shifting device, the combination of: an envelope containing an ionizable medium; a plurality of external electrodes connected to define a plurality of glow discharge positions; means for initiating a glow discharge at a selected glow discharge position; and means connected to said external electrodes for sequentially shifting said glow discharge from one of said glow charge positions to another one of said positions.

27. A gaseous discharge device comprising: a channel having therein an ionizable medium; a plurality of electrodes connected in iterative arrays and positioned in glow sustaining relation to said medium; input means for establishing a pattern of glows and no-glows in said channel; shifting control means; at least one energizing potential generator; and a circuit connecting said generator to said arrays and controlled by said shifting control means for shifting the entire pattern of glows and no-glows along said channel.

28. A gaseous discharge device as defined by claim 27, and wherein said energizing potential generator comprises a high frequency generator.

29. A gaseous discharge device comprising: a channel having therein an ionizable medium; glow holding means defining a plurality of discrete glow discharge positions along said channel; means for establishing a selected pattern of glows and no-glows at said glow discharge positions; shifting means positioned between said glow discharge positions; at least one high frequency energizing potential generator for supplying energizable potentials for said holding and shifting means; and means for controlling the application of said energizable potentials for shifting said pattern in said channel.

30. An information registering device comprising: a channel having therein an ionizable medium; a plurality of holding and shifting electrodes arranged in iterative arrays along said channel and defining a plurality of discrete ionizable positions; a high frequency energizing potential generator; means for normally applying the high frequency energizing potential to said holding electrodes; input means for establishing ionization at selected holding electrodes to form an information representing pattern; and a circuit for sequentially de-energizing said holding electrodes, momentarily energizing said shifting electrodes and re-energizing said holding electrodes for shifting said pattern.

31. An information registering device comprising: a plurality of holding and shifting electrodes arranged in extended iterative arrays, including an array of holding electrodes and at least two arrays of shifting electrodes; means forming a common electrode spaced in discharge sustaining relation to said iterative arrays; an ionizable medium between said means and said arrays; a normally operative high frequency energizing potential generator; means connecting said generator to said array of holding electrodes; means for initiating ionization at at least one of said holding electrodes; means for temporarily de-energizing said array of holding electrodes; and a circuit operable in timed relation to the de-energization of said array of holding electrodes for sequentially energizing the arrays of shifting electrodes to advance said ionization from one holding electrode to another during each cycle of operation of said cyclically operable means.

32. An information registering device comprising: a plurality of holding and shifting electrodes connected in a sequentially alternate arrangement to form a plurality of iterative arrays with each adjacent pair of electrodes positioned in priming relation to one another; means forming a common electrode spaced in discharge sustaining relation to said arrays; an ionizable medium between said means and said arrays; means for initiating a discrete ionization at each of a selected plurality of said holding electrodes; at least one high frequency energizing potential generator; and means for applying said energizing potential to said arrays including means for altering the energization of said arrays in a predetermined sequence for advancing each ionization to a successive holding electrode.

33. An information registering device comprising: an elongated envelope containing an ionizable medium; a plurality of external electrodes disposed adjacent said envelope to define a plurality of discrete ionization sustaining positions; means for initiating ionization at at least one of said positions; and cyclically operable means connected to said external electrodes for sequentially shifting the ionization from one of said positions to another.

34. An information registering device comprising: a channel having therein an ionizable medium; a plurality of electrodes disposed adjacent said channel to define a plurality of discrete ionization positions; means for entering information into said channel comprising means for initiating ionization at at least one of said positions; at least one high frequency energizing potential generator for supplying energizing potentials to said electrodes; and a cyclically operable circuit for altering the energization of said electrodes for shifting each discrete ionization from one of said positions to another.

35. An information registering device comprising: a channel having therein an ionizable medium; a plurality of electrodes disposed adjacent said channel to define a plurality of discrete ionization sustaining positions; energizing potential generating means for supplying energizing potentials to said electrodes; a selectably operable input circuit for initiating ionization at selected ones of said positions for establishing a pattern of ionizations representative of the information to be registered; and a cyclically operable circuit for altering the energization of said electrodes for shifting said pattern along said channel.

References Cited in the file of this patent

UNITED STATES PATENTS

| | | |
|---|---|---|
| 2,443,407 | Wales | June 15, 1948 |
| 2,598,677 | Depp | June 3, 1952 |
| 2,607,015 | Townsend | Aug. 12, 1952 |
| 2,651,004 | Acton | Sept. 1, 1953 |
| 2,651,741 | Koehler | Sept. 8, 1953 |
| 2,700,146 | Bachelet | Jan. 18, 1955 |
| 2,714,179 | Thomas | July 26, 1955 |